(12) United States Patent
Keigley

(10) Patent No.: US 7,540,331 B1
(45) Date of Patent: Jun. 2, 2009

(54) SOIL WORKING IMPLEMENT WITH RETRACTABLE WHEELS

(75) Inventor: Kevin V. Keigley, Osceola, IN (US)

(73) Assignee: Absolute Innovations, Inc., Osceola, IN (US)

( * ) Notice: Subject to any disclaimer, the term of this patent is extended or adjusted under 35 U.S.C. 154(b) by 174 days.

(21) Appl. No.: 11/484,017

(22) Filed: Jul. 10, 2006

Related U.S. Application Data

(63) Continuation-in-part of application No. 10/990,330, filed on Nov. 16, 2004, now Pat. No. 7,478,682, which is a continuation of application No. 10/675,395, filed on Sep. 30, 2003, now abandoned.

(51) Int. Cl.
*A01B 49/02* (2006.01)

(52) U.S. Cl. .................. 172/195; 172/200; 172/664; 172/445.1

(58) Field of Classification Search ......... 172/195–200, 172/663–668, 449, 445.1, 777, 683, 684.5
See application file for complete search history.

(56) References Cited

U.S. PATENT DOCUMENTS

| | | | |
|---|---|---|---|
| 512,573 | A | 1/1894 | Ayre |
| 1,447,862 | A | 3/1923 | Jones |
| 1,585,307 | A | 5/1926 | Maney |
| 2,994,388 | A | 8/1961 | Ryan |
| 3,336,685 | A | 8/1967 | Keller |
| 3,613,802 | A | 10/1971 | Carlson |
| 3,774,694 | A | 11/1973 | Gates |
| 3,774,695 | A | 11/1973 | Voorhees |
| 3,776,317 | A | 12/1973 | Royer |
| 3,835,932 | A | 9/1974 | Mitchell |
| 3,926,262 | A | 12/1975 | Brooks |
| 4,196,778 | A | 4/1980 | Smith |
| 4,217,962 | A | 8/1980 | Schaefer |
| 4,333,250 | A | 6/1982 | Henderson |
| 4,393,943 | A | 7/1983 | Andersson |
| 4,472,930 | A | 9/1984 | Smith |
| 4,535,847 | A | 8/1985 | Hasegawa |
| 4,650,006 | A * | 3/1987 | Reimann .................... 172/443 |
| 4,703,810 | A * | 11/1987 | Meiners ..................... 172/178 |
| 4,924,945 | A | 5/1990 | Mork |
| 4,967,850 | A | 11/1990 | Bargfrede |
| 5,211,247 | A | 5/1993 | Johnsen |

(Continued)

FOREIGN PATENT DOCUMENTS

FR 1314296 11/1962

(Continued)

*Primary Examiner*—Alicia M Torres
(74) *Attorney, Agent, or Firm*—Botkin & Hall, LLP

(57) ABSTRACT

A soil working implement is dragged behind a towing vehicle. The implement includes a hitch part and a soil working part. The soil working part may be pivoted about the hitch part by extending or retracting a longitudinal linkage member interposed between the hitch part and the soil working part. Wheels are mounted on the implement and may be raised and lowered relative to the implement by an operator-actuated mechanism, to thereby permit the soil working part to be raised off of the ground by lowering the wheels to thereby facilitate movement of the implement from one treatment area to another, whereupon the wheels may be raised to permit the soil working part to engage the soil.

2 Claims, 5 Drawing Sheets

U.S. PATENT DOCUMENTS

| | | |
|---|---|---|
| 5,265,975 A | 11/1993 | Scott |
| 5,407,015 A | 4/1995 | Swords |
| 5,515,625 A | 5/1996 | Keigley |
| 5,535,832 A | 7/1996 | Benoit |
| 5,806,605 A | 9/1998 | Keigley |
| 5,890,545 A | 4/1999 | Smith et al. |
| 5,911,279 A | 6/1999 | Whitener |
| 6,032,746 A | 3/2000 | Lowery |
| 6,085,847 A | 7/2000 | Lange et al. |
| 6,739,404 B2 | 5/2004 | Keigley |

FOREIGN PATENT DOCUMENTS

| | | |
|---|---|---|
| GB | 2129034 | 5/1984 |

* cited by examiner

SOIL WORKING IMPLEMENT WITH RETRACTABLE WHEELS

CROSS REFERENCE TO RELATED APPLICATIONS

This application is a continuation-in-part of application Ser. No. 10/990,330, filed Nov. 16, 2004, now U.S. Pat. No. 7,478,682 which is a continuation of application Ser. No. 10/675,395, filed Sep. 30, 2003 now abandoned.

BACKGROUND OF THE INVENTION

1. Field of the Invention

The present invention relates to a soil working implement that is pulled behind a towing vehicle.

2. Description of the Prior Art

Landscaping professionals and caretakers responsible for maintenance of a dirt arena commonly must loosen and then smooth and grade soil. Reference is made to my prior art U.S. Pat. Nos. 5,806,605; 5,515,625 and 6,739,404, which discloses such implements. As shown in these patents, these implements have been mounted on the lift arms of a skid steer loader or to a three-point hitch of a tractor, both of which are equipped with hydraulic actuating systems which can easily raise and lower the implement so that the implement can be used to scarify, rake and grade soil and then raised to permit transfer of the implement without damage to the implement.

Arena caretakers commonly use smaller implements that are pulled by smaller vehicles; for example, garden tractors. These vehicles are commonly not equipped with hydraulic lift systems and thus are incapable of raising and lowering the implement to permit easy movement of the implement in to and out of an arena, or to move the implement across hard surfaces. Reference is made to my copending U.S. patent application Ser. No. 10/990,330, which discloses such an implement.

SUMMARY OF THE INVENTION

The present invention relates to an implement that is towed behind a tractor, for example, a small garden tractor. The implement includes a hitch frame carrying a hitch for connection with the tractor. A transverse frame is pivotally mounted on the hitch frame. An extendible linkage is connected between the frames for adjusting the angular position of the transverse frame relative to the hitch frame. A plurality of transversely spaced, downwardly projecting scarifying teeth are mounted on the transverse frame for penetrating the soil for scarifying the soil as the implement is pulled over the soil, and a plurality of transversely spaced tines are also mounted on the transverse frame for engaging and working the soil as the scarifying teeth scarify the soil. Accordingly, the degree of loosening and smoothing of the soil by the scarifying teeth and by the tines respectively may be adjusted. A pair of retractable supporting wheels is mounted on a wheel supporting structure or frame pivotally mounted on the transverse frame, and an operator-actuated mechanism is connected between the wheel supporting structure and the hitch frame. The operator-actuated mechanism moves the wheels between a ground engaging position supporting the tines and the teeth in an inoperative position displaced from the soil when the implement is to be moved over a surface which is not to be scarified or smoothed, and a retracted position in which the wheels are displaced from the soil to permit the tines and the teeth to engage and work the soil.

DESCRIPTION OF THE PREFERRED EMBODIMENT

Figure 1:
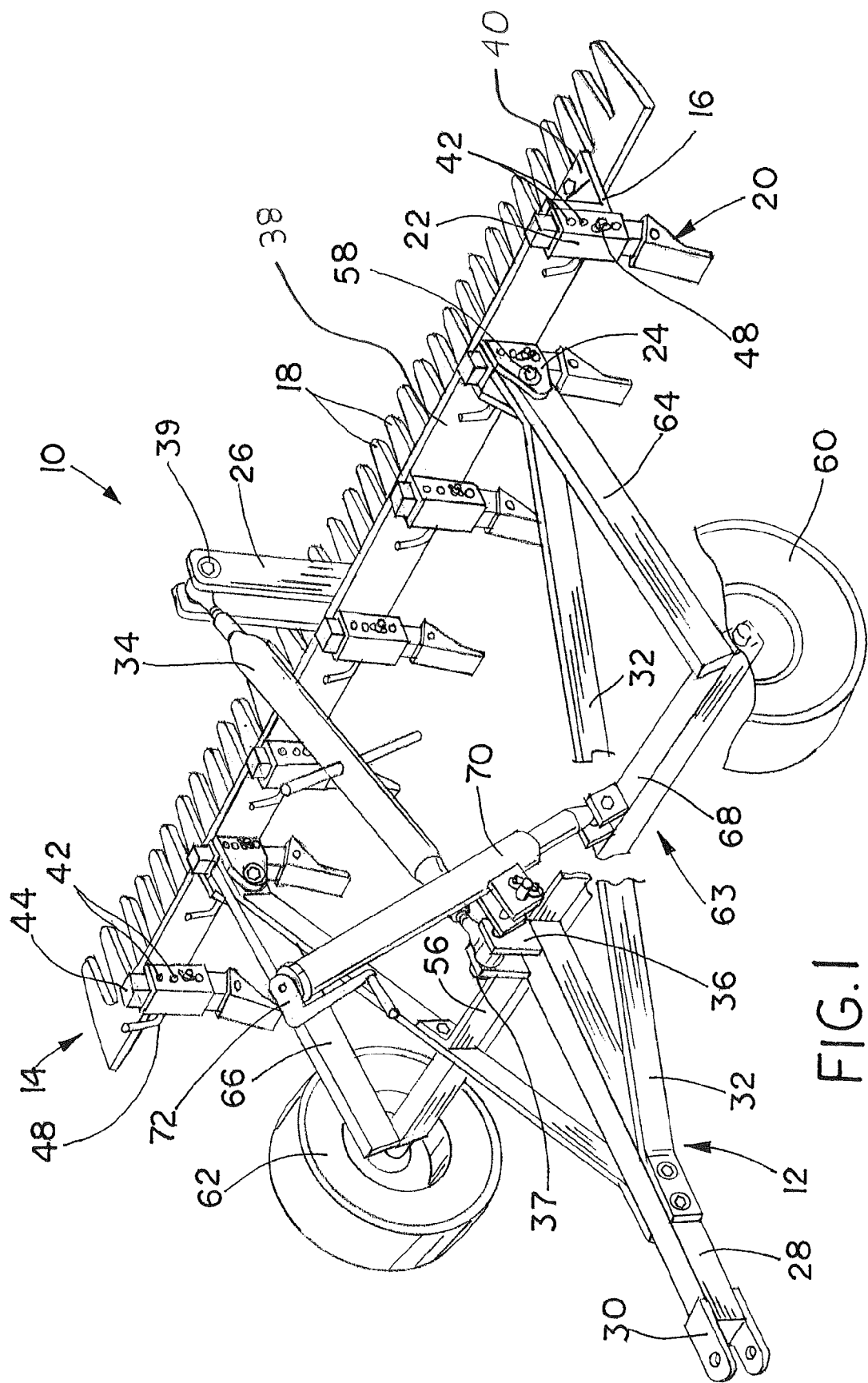
FIG. 1 is a view in perspective of an implement made pursuant to the teaching of the present invention.
Figure 2:
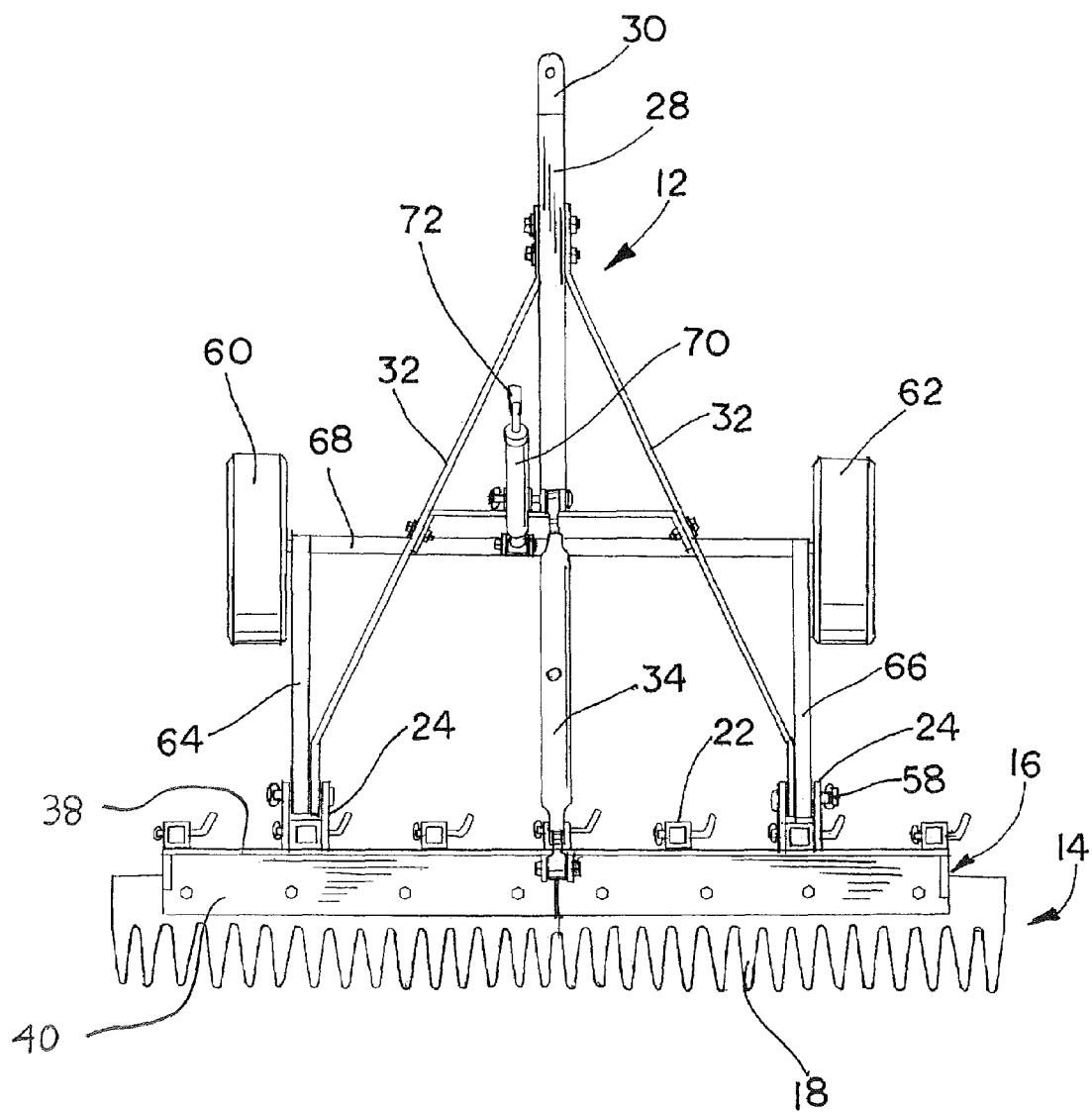
FIG. 2 is a top plan view of the implement illustrated in FIG. 1.
Figure 3:
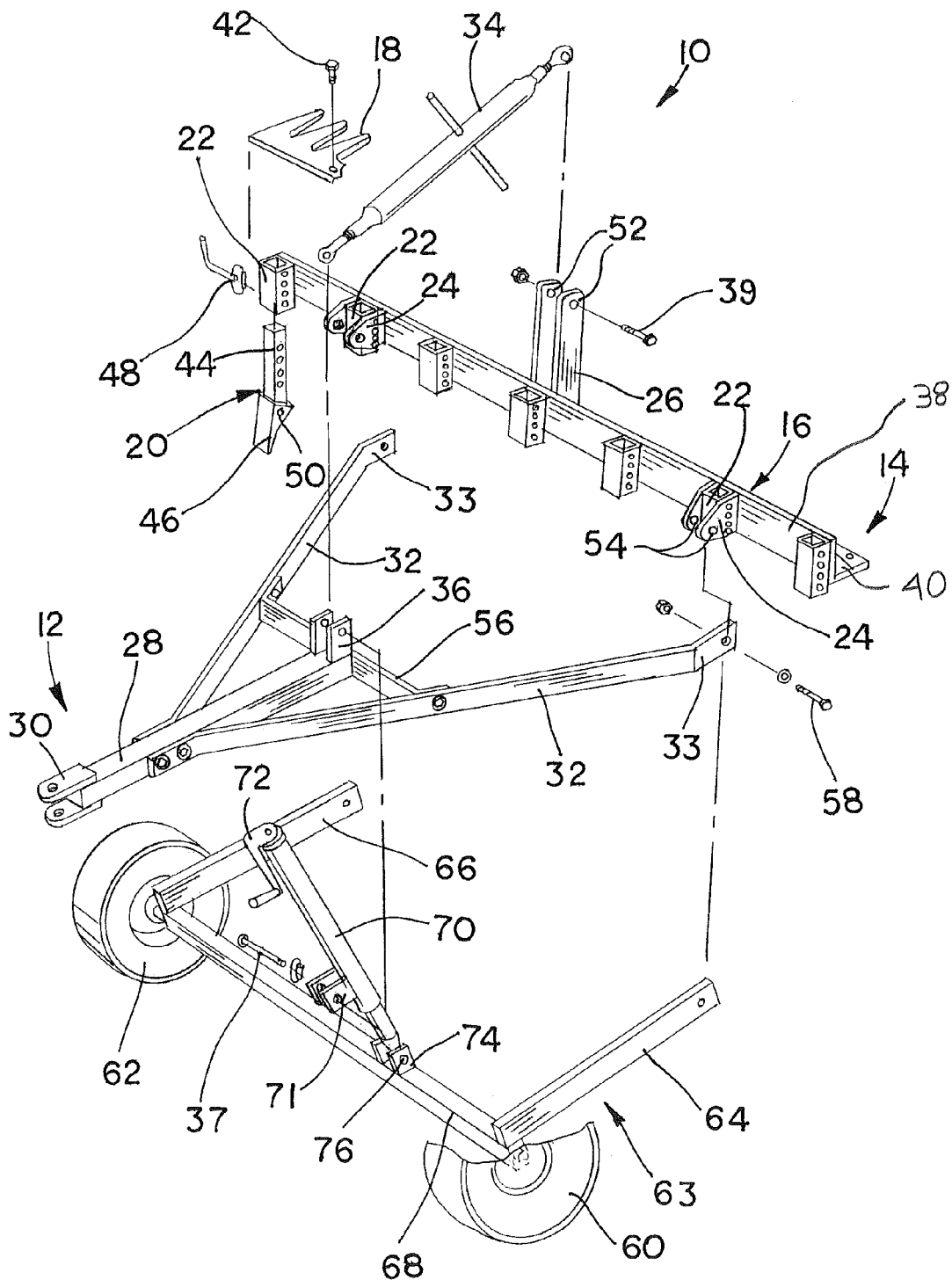
FIG. 3 is an exploded view in perspective of the implement illustrated in FIGS. 1 and 2.

Referring now to the drawings, a drag behind soil working implement 10 includes a hitch part or frame 12 and a soil working part 14. Soil working part 14 includes a transverse frame member 16 carrying raking tines 18 and scarifying teeth 20. Hitch part 12 includes a longitudinal hitch bar 28, a hitch 30, and an extensible and retractable turnbuckle 34. Implement 10 is hitched to a tow vehicle 11 (shown partially in broken lines) by securing hitch 30 to the tow vehicle's hitch in any convenient manner such that the tow vehicle can drag the implement behind it over a path of soil.

Focusing now on soil working part 14, frame member 16 is generally a piece of angle structural steel having a generally vertical upwardly oriented leg 38 and a generally horizontal rearwardly oriented leg 40. Tines 18 are secured along the length of horizontal leg 40 with fasteners 42. Tines 18 are longitudinally oriented in a plane extending behind frame member 16 and transversely spaced from each other to allow soil to pass between adjacent tines while also smoothing the soil when pulled over the soil. A plurality of scarifying teeth 20 are located along frame member 16 transversely spaced from each other and downwardly oriented for penetration into the soil to scarify the soil when dragged across the soil. Each tooth 20 is carried within a tooth bracket 22 carried by the vertical leg 38 of frame member 16. Each bracket 22 is generally a length of structural tube steel with a plurality of vertically spaced opposed aligned holes 42 through opposite sides of the bracket walls. Each tooth 20 includes a mounting bar 44 for mounting to brackets 22 and a tooth portion 46 for penetration into the soil. Mounting bar 44 is a length of bar stock steel with holes through it for insertion into bracket 22. Tooth portion 42 is removably mounted to mounting bar 44 with a fastener 50, which allows a worn tooth to be easily replaced with a new one. Each tooth 20 is secured within each bracket 22 by aligning a hole on bar 44 with one of the aligned sets of bracket holes 42 and then inserting a retaining pin 48 through the aligned set of holes. A hitch bracket 26 is carried by frame member 16 and extends above the frame member. Hitch bracket 26 includes a pair of aligned pin holes 52. An aligned hitch bracket 24 is carried on each opposite side of hitch bracket 26 by a selected pair of brackets 22. Brackets 24 are equally and oppositely laterally spaced from bracket 26. Each bracket 24 includes a pair of aligned pin holes 54 for accepting a retaining pin.

On hitch part 12, hitch 30 is carried on one end of hitch bar 28. Hitch 30 is preferably a single point hitch such as a typical tongue and groove hitch or other such hitch that does not provide for orientational control of the implement. A turnbuckle bracket 36 is carried at the opposite end of hitch bar 28 and is adapted to be pivotally secured to one end of turnbuckle 34 with a pin 37. A mounting bar 32 is carried on each opposite side of hitch bar 28 at a medial point along hitch bar 28 and extends angularly behind and horizontally aligned with the bracket end of the hitch bar. A brace 56 extends across hitch bar 28 and between mounting bars 32 to provide lateral stability to implement 10 when being towed. The free end 33 of each mounting bar is pivotally secured to hitch brackets 24 with a removable retaining pin 58. Turnbuckle 34 is pivotally secured to bracket 36 at one end with pin 37 and pivotally secured to bracket 26 at its other end with pin 39. Turnbuckle 34 is preferably of the known type including an outer sleeve threaded about a pair of longitudinally aligned extended threaded members that may be longitudinally extended or retracted by twisting the sleeve about the extended threaded members. Other longitudinally extensible links could be used, such as a hydraulic cylinder for example. Soil working portion 14 may be pivoted on hitch portion 12 about retaining pins 58 by extending or retracting turnbuckle 34.

The implement 10 is supported for movement from place to place with the soil working part raised by a pair of wheels 60, 62. Wheels 60, 62 are mounted on wheel supporting structure or frame generally indicated by the numeral 63. Structure 63 includes a pair of side frame members 64, 66 connected by a transverse frame member 68. The wheels 60, 62 are mounted on opposite ends of the transverse frame member 68. The side frame members 64, 66 are pivotally connected to a corresponding one of the brackets 24 by corresponding pins 58. A conventional hand crank actuator generally indicated by the numeral 70 is mounted between the hitch part or frame 28 and the wheel supporting structure 63 via bracket 71 on the actuator 70 (which is pivotally connected to bracket 36 by the pin 37, which also pivotally secures the turnbuckle 34 to bracket 36). The actuator 70 is also pivotally connected to transverse frame member 68 by bracket 74 and pin 76. Actuator 70 is an extensible member (such as a conventional jackscrew mechanism), and can be lengthened or retracted by rotation of a hand crank 72 to thereby raise and lower the wheels 60, 62 relative to the implement 10. Although illustrated as a hand crank mechanism, other appropriate actuators, such as hydraulic actuators, may be used.

Figure 4:
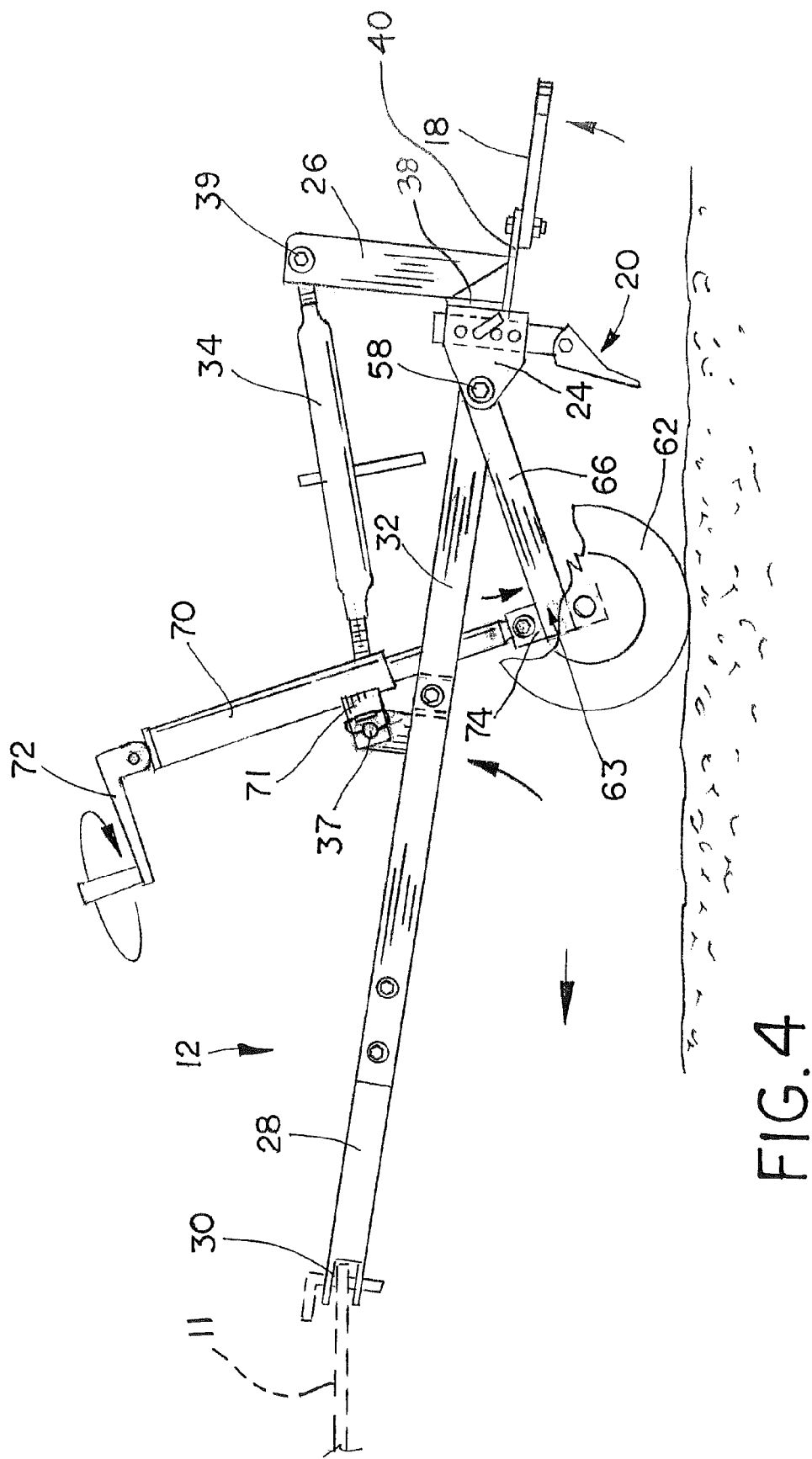
FIG. 4 is a side view of the implement illustrated in FIGS. 1-3, illustrating the implement with the wheels thereof in the lowered, ground-engaging position.
Figure 5:
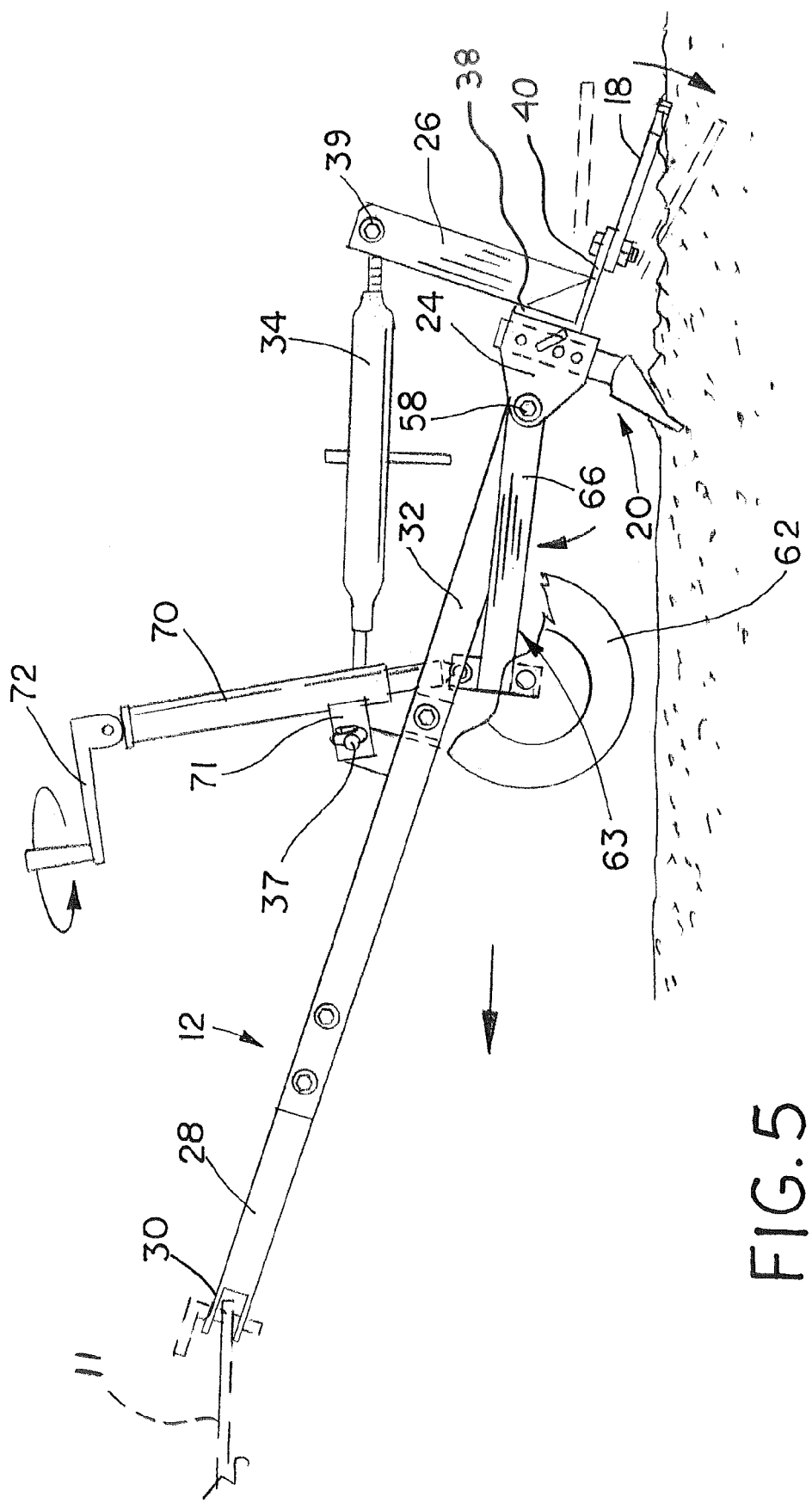
FIG. 5 is a view similar to FIG. 4, with the wheels of the implement in the raised position permitting the scarifying teeth and the tines to engage the soil.

In use, implement 10 is hitched to a towing vehicle, such as a truck, tractor, lawn tractor, four wheeler, etc., and dragged over the soil in a path behind the towing vehicle. The weight of the implement 10 causes its scarifying teeth 20 to penetrate into the soil to loosen the soil, and its rake tines 18 follow to smooth the furrows created by the scarifying teeth. The penetration depth of teeth 20 into the soil may be adjusted by raising or lowering the teeth within brackets 22. The penetration depth of teeth 20 may also be controlled by varying the angle of attack of the teeth into the soil. The angle of attack of teeth 20 into the soil may be adjusted by pivoting the soil engaging part 14 about the hitch part 12 through the use of turnbuckle 34. An acute angle of attack will cause the teeth to pull the entire implement down into the soil as it is dragged across the soil whereas an obtuse angle of attack will not urge teeth deeper into the soil. Soil engaging part 14 may be pivoted between limits where either only the scarifying teeth 20, only the rake tines 18 engage the soil, or intermediate positions where both the teeth and the tines engage the soil. Teeth 20 may also be completely removed from brackets 22 so that only the rake tines 18 engage the soil to smooth the soil without first scarifying it. As illustrated in FIG. 4, the implement 10 may be transported from place to place by operating hand crank 72 to lower wheel supporting structure 63 until the wheels 60, 62 engage the ground, and by thereafter continuing to turn hand crank 72 to raise the hitch part 28 and soil working part 14, thereby raising the tines 28 and scarifying teeth 20, to permit the implement to be moved by the tractor pulling the implement from one area where soil is treated to a subsequent area where soil is to be treated. Upon arrival at the subsequent treatment area, the hand crank 72 is operated to raise the wheels 60, 62 to the position illustrated in FIG. 5, to thereby permit the tines 18 and scarifying teeth 20 to again engage the soil to scarify and smooth the latter.

The detailed description hereinbefore related is only meant to exemplify the invention to enable those skilled in the art to make and use it. The subject invention is not to be limited to the details given above for the preferred embodiment, but may be modified within the scope of the impending claims.

What is claimed is:

1. Soil working implement adapted for being pulled behind a tow vehicle, said implement comprising a soil working part for engaging the soil, a hitch part pivotally connected to said soil working part and including a hitch adapted for connection to said tow vehicle, an extensible linkage connected to said soil working part, said extensible linkage having an extended position and a retracted position, said soil working part pivotally shiftable about said hitch part in response to the shifting of said extensible linkage between its said extended and retracted positions, said soil working part including a transverse frame member pivotable about an axis, a plurality of transversely spaced downwardly projecting scarifying teeth carried by said frame member for penetrating the soil, a plurality of transversely spaced tines carried by said frame member for engaging said soil, said hitch part including a hitch bar carrying said hitch and being pivotally connected at said axis to said frame member, said teeth located between said hitch and said tines, said extensible linkage pivotally connected at one end to said frame member and at the other end to said hitch bar, the angle of engagement of said teeth and tines with said soil being adjustable by shifting said extensible linkage between its extended and retracted positions, a set of ground engaging support members pivotally mounted on said axis for movement between a ground engaging position supporting said tines and teeth in an inoperative position displaced from the soil and a retracted position in which the support members are displaced from the soil to permit the tines and the teeth to engage and work the soil.

2. Soil working implement as claimed in claim 1, wherein a retractable frame is pivotally mounted on said implement at said axis, said support members being a pair of wheels mounted on said frame, and an operator actuated mechanism for moving said frame and said wheels between said ground engaging and retracted positions.

* * * * *